United States Patent
Kim et al.

(10) Patent No.: US 9,680,577 B2
(45) Date of Patent: Jun. 13, 2017

(54) METHOD FOR REMOVING INTERFERENCE IN WIRELESS COMMUNICATION SYSTEM AND DEVICE FOR SAME

(71) Applicant: LG Electronics Inc., Seoul (KR)

(72) Inventors: Eunsun Kim, Gyeonggi-di (KR); Hanbyul Seo, Gyeonggi-do (KR); Kijun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/786,622

(22) PCT Filed: Sep. 3, 2013

(86) PCT No.: PCT/KR2013/007930
§ 371 (c)(1),
(2) Date: Oct. 23, 2015

(87) PCT Pub. No.: WO2014/178486
PCT Pub. Date: Nov. 6, 2014

(65) Prior Publication Data
US 2016/0080094 A1 Mar. 17, 2016

Related U.S. Application Data

(60) Provisional application No. 61/818,465, filed on May 2, 2013.

(51) Int. Cl.
*H04B 15/00* (2006.01)
*H04B 7/0452* (2017.01)
(Continued)

(52) U.S. Cl.
CPC ............ *H04B 15/00* (2013.01); *H04L 5/001* (2013.01); *H04L 5/0037* (2013.01);
(Continued)

(58) Field of Classification Search
CPC ...................................................... H04B 15/00
See application file for complete search history.

(56) References Cited

U.S. PATENT DOCUMENTS

2006/0258343 A1* 11/2006 Schotten ............... H04W 24/08
455/418
2007/0183544 A1* 8/2007 Lee ........................ H04B 1/123
375/346

(Continued)

FOREIGN PATENT DOCUMENTS

KR 10-2010-0118067 A 11/2010
WO 2012/074305 A2 6/2012
(Continued)

OTHER PUBLICATIONS

International Search Report issued in corresponding International Patent Application No. PCT/KR2013/007930 dated Jan. 27, 2014.
(Continued)

*Primary Examiner* — Cindy Trandai
(74) *Attorney, Agent, or Firm* — Morgan, Lewis & Bockius LLP

(57) ABSTRACT

A method by which a base station supports the removal of an interference signal from a reception signal of a terminal in a wireless communication system, according to one embodiment of the present invention, comprises the steps of receiving, from the terminal, information on capability relating to carrier aggregation (CA); determining a method for removing an interference signal of the terminal, on the basis of information on the capability relating to the CA; and transmitting, to the terminal, the determined interference signal removal method, wherein the information on the capability relating to the CA can include a CA bandwidth class and MIMO capability of the terminal for the respective bands of respective band combinations for the CA.

9 Claims, 8 Drawing Sheets

(51) Int. Cl.
*H04B 7/0456* (2017.01)
*H04L 5/00* (2006.01)
*H04W 72/08* (2009.01)
*H04W 88/02* (2009.01)
*H04W 88/08* (2009.01)
*H04L 1/00* (2006.01)
*H04L 1/18* (2006.01)

(52) U.S. Cl.
CPC ......... *H04L 5/0062* (2013.01); *H04W 72/082* (2013.01); *H04L 1/0031* (2013.01); *H04L 1/1861* (2013.01); *H04L 1/1896* (2013.01); *H04W 88/02* (2013.01); *H04W 88/08* (2013.01)

(56) References Cited

U.S. PATENT DOCUMENTS

| | | | | |
|---|---|---|---|---|
| 2007/0286238 A1* | 12/2007 | Wang | ........... | H04L 5/04 370/478 |
| 2010/0303034 A1* | 12/2010 | Chen | ........... | H04L 5/0023 370/329 |
| 2011/0103247 A1* | 5/2011 | Chen | ........... | H04B 7/0452 370/252 |
| 2012/0039252 A1 | 2/2012 | Damnjanovic et al. | | |
| 2012/0044898 A1* | 2/2012 | Ishii | ........... | H04W 52/146 370/329 |
| 2012/0057490 A1 | 3/2012 | Park et al. | | |
| 2012/0120829 A1* | 5/2012 | Blankenship | ........... | H04L 5/001 370/252 |
| 2013/0201932 A1* | 8/2013 | Ko | ........... | H04L 1/0061 370/329 |
| 2013/0250903 A1 | 9/2013 | Ahn et al. | | |
| 2013/0322302 A1* | 12/2013 | Gholmieh | ........... | H04W 36/24 370/280 |
| 2014/0029560 A1* | 1/2014 | Kim | ........... | H04L 5/001 370/329 |
| 2014/0051426 A1* | 2/2014 | Siomina | ........... | H04W 36/0088 455/422.1 |
| 2014/0080477 A1 | 3/2014 | Kim et al. | | |
| 2014/0092825 A1* | 4/2014 | Bostrom | ........... | H04W 72/048 370/329 |
| 2014/0233407 A1* | 8/2014 | Pourahmadi | ........... | H04L 5/0051 370/252 |
| 2014/0242995 A1 | 8/2014 | Lee et al. | | |
| 2014/0301251 A1* | 10/2014 | Chen | ........... | H04W 72/02 370/278 |
| 2015/0334637 A1* | 11/2015 | Kim | ........... | H04W 48/12 370/312 |

FOREIGN PATENT DOCUMENTS

| | | |
|---|---|---|
| WO | 2012/177094 A2 | 12/2012 |
| WO | 2013/055173 A2 | 4/2013 |

OTHER PUBLICATIONS

Written Opinion issued in corresponding International Patent Application No. PCT/KR2013/007930 dated Jan. 27, 2014.

* cited by examiner

US 9,680,577 B2

METHOD FOR REMOVING INTERFERENCE IN WIRELESS COMMUNICATION SYSTEM AND DEVICE FOR SAME

TECHNICAL FIELD

The present invention relates to a wireless communication system, and more particularly, to a method for supporting the removal of interference in a wireless communication system and a device for the same.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention is to provide a method for supporting the removal of interference in a wireless communication system.

Another object of the present invention is to provide a method for using specific information used for another purpose of use as a condition for the removal of interference.

The technical objects that can be achieved through the present invention are not limited to what has been particularly described hereinabove and other technical objects not described herein will be more clearly understood by persons skilled in the art from the following detailed description.

Technical Solution

According to one embodiment of the present invention, a method for enabling a base station to support cancellation of an interfering signal from a received signal of a user equipment (UE) in a wireless communication system comprises the steps of receiving, from the UE, information on capability relating to carrier aggregation (CA); determining a cancellation scheme of an interfering signal of the UE, on the basis of the information on capability relating to CA; and transmitting, to the UE, the determined cancellation scheme of the interfering signal, wherein the information on capability relating to CA includes a CA bandwidth class and MIMO capability of the UE for each band of each band combination for the CA.

Preferably, the cancellation scheme of the interfering signal of the UE may be one of a decoding based interference cancellation scheme and a demodulation based interference cancellation scheme.

Preferably, the step of determining a cancellation scheme of an interfering signal of the UE may be performed per band of each band combination.

Preferably, the cancellation scheme of the interfering signal of the UE may additionally be determined on the basis of the number of codewords scheduled for the UE and an uplink timing advance value for the UE.

Preferably, the step of determining a cancellation scheme of an interfering signal of the UE includes selecting the decoding based interference cancellation scheme as the cancellation scheme of the interfering signal of the UE if $N_{CC}-N \geq 1$, $N_{LAYERS}-n_{LAYERS} \geq 1$, $N_{CW}-n_{CW} \geq 1$ and $T_{TA} \leq T_{TA\_Threshold}$; and selecting the demodulation based interference cancellation scheme as the cancellation scheme of the interfering signal of the UE if not so, where $N_{CC}$ is the maximum number of CCs that may be supported by the UE, $N_{LAYERS}$ is the maximum number of layers that may be supported by the UE, $n_{LAYERS}$ is the number of layers a downlink signal intended to the UE, $N_{CW}$ is the maximum number of codewords that may be supported by the UE, $n_{CW}$ is the number of codewords of a downlink signal intended to the UE, $T_{TA}$ is an uplink timing advance value for the UE, and $T_{TA\_Threshold}$ is a specific threshold value.

According to one embodiment of the present invention, a method for enabling a user equipment (UE) to receive information required for cancellation of an interfering signal from a received signal in a wireless communication system comprises the steps of reporting, to a base station, carrier aggregation (CA) related capability of the UE; and receiving, from the base station, information on a cancellation scheme of an interfering signal of the UE, which is determined on the basis of the CA related capability, wherein the information on the CA related capability includes a CA bandwidth class and MIMO capability of the UE for each band of each band combination for the CA.

Preferably, the cancellation scheme of the interfering signal of the UE may be one of a decoding based interference cancellation scheme and a demodulation based interference cancellation scheme.

Preferably, the cancellation scheme of the interfering signal of the UE may be determined per band of each band combination.

Preferably, the cancellation scheme of the interfering signal of the UE may additionally be determined on the basis of the number of codewords scheduled for the UE and an uplink timing advance value for the UE.

According to another embodiment of the present invention, a base station for supporting cancellation of an interfering signal from a received signal of a user equipment (UE) in a wireless communication system comprises a radio frequency (RF) unit; and a processor configured to control the RF unit, wherein the processor is configured to receive, from the UE, information on capability relating to carrier aggregation (CA), determine a cancellation scheme of an interfering signal of the UE, on the basis of the information on capability relating to CA, and transmit, to the UE, the determined cancellation scheme of the interfering signal, and the information on capability relating to CA includes a CA bandwidth class and MIMO capability of the UE for each band of each band combination for the CA.

According to still another embodiment of the present invention, a user equipment (UE) configured to receive information required for cancellation of an interfering signal from a received signal in a wireless communication system comprises a radio frequency (RF) unit; and a processor configured to control the RF unit, wherein the processor is configured to report, to a base station, carrier aggregation (CA) related capability of the UE and receive, from the base station, information on a cancellation scheme of an interfering signal of the UE, which is determined on the basis of the CA related capability, and the information on the CA related capability includes a CA bandwidth class and MIMO capability of the UE for each band of each band combination for the CA.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, the removal of interference in a wireless communication system may be performed efficiently.

Also, according to one embodiment of the present invention, since specific information used for another purpose of use is used as a condition for the removal of interference, resource utility may be increased.

A set of coordinated multiple-point transmission and reception (CoMP) may be determined efficiently in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
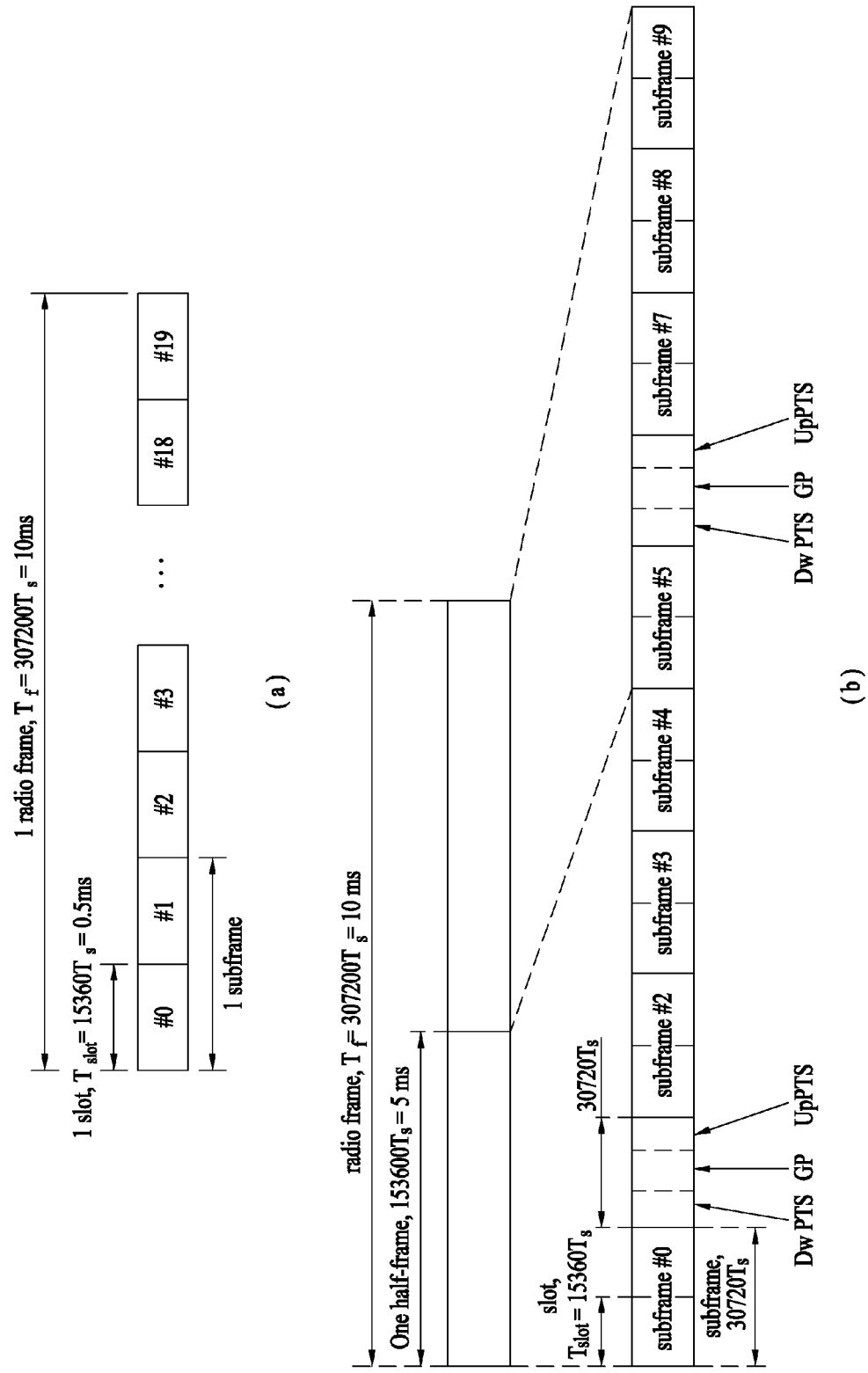
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource.

Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| | | Normal | | | Normal | |
| Special subframe configuration | DwPTS | cyclic prefix in uplink | Extended cyclic prefix in uplink | DwPTS | cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |

Figure 2:
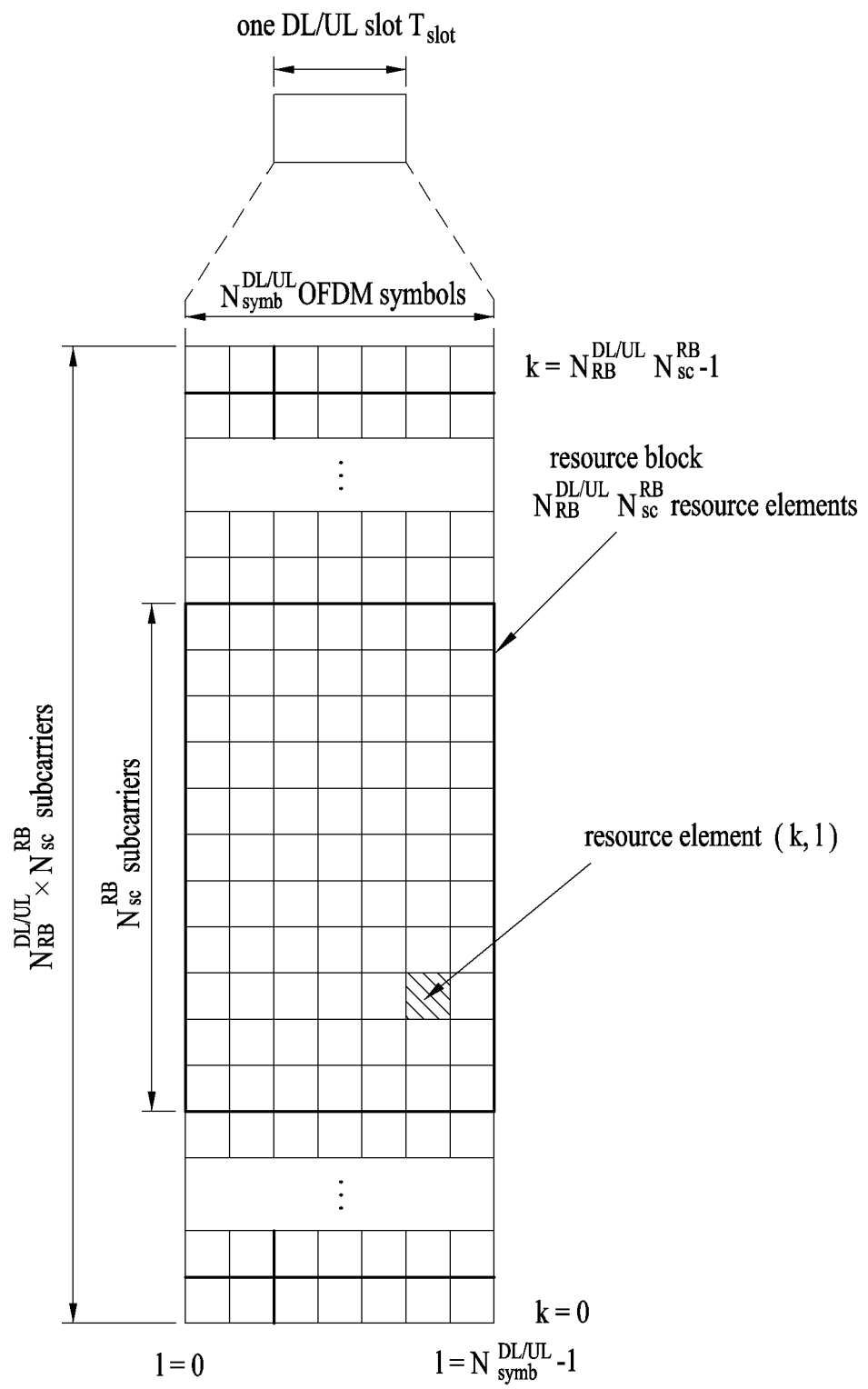
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
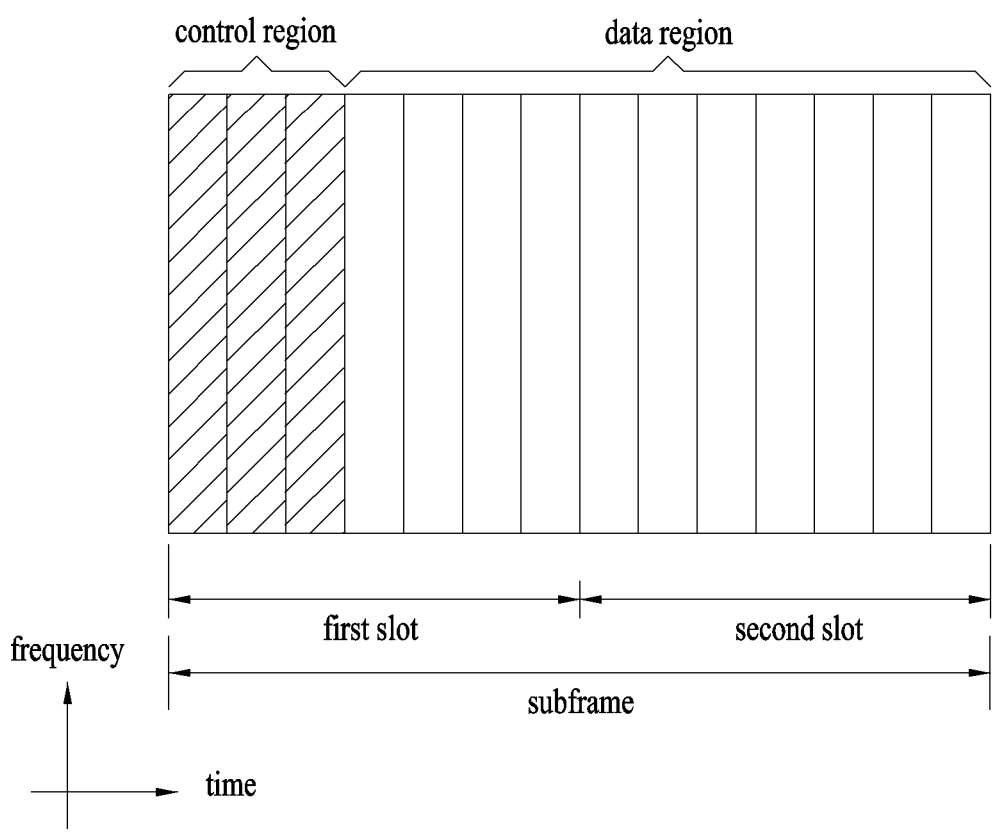
FIG. 3 is a diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
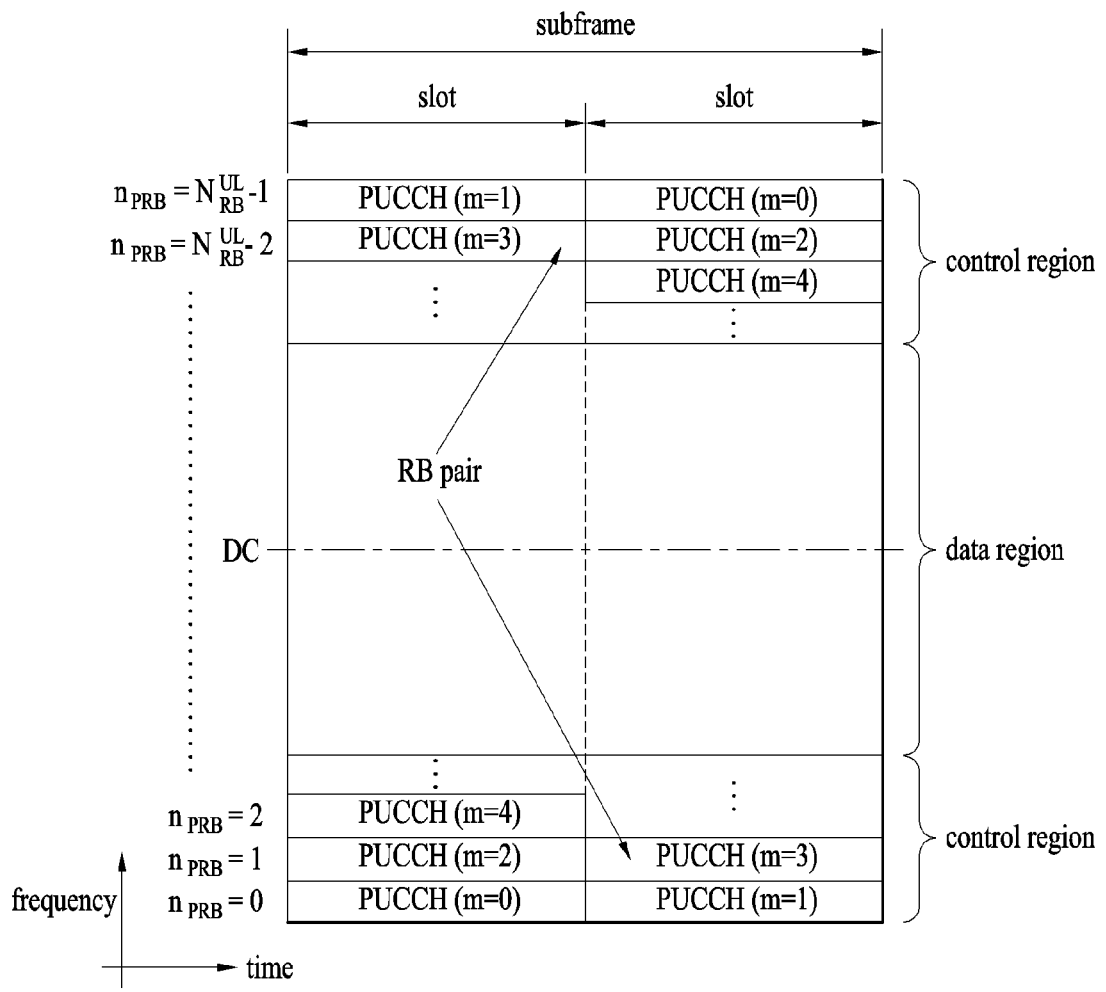
FIG. 4 is a diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Carrier Aggregation (CA)

Figure 5:
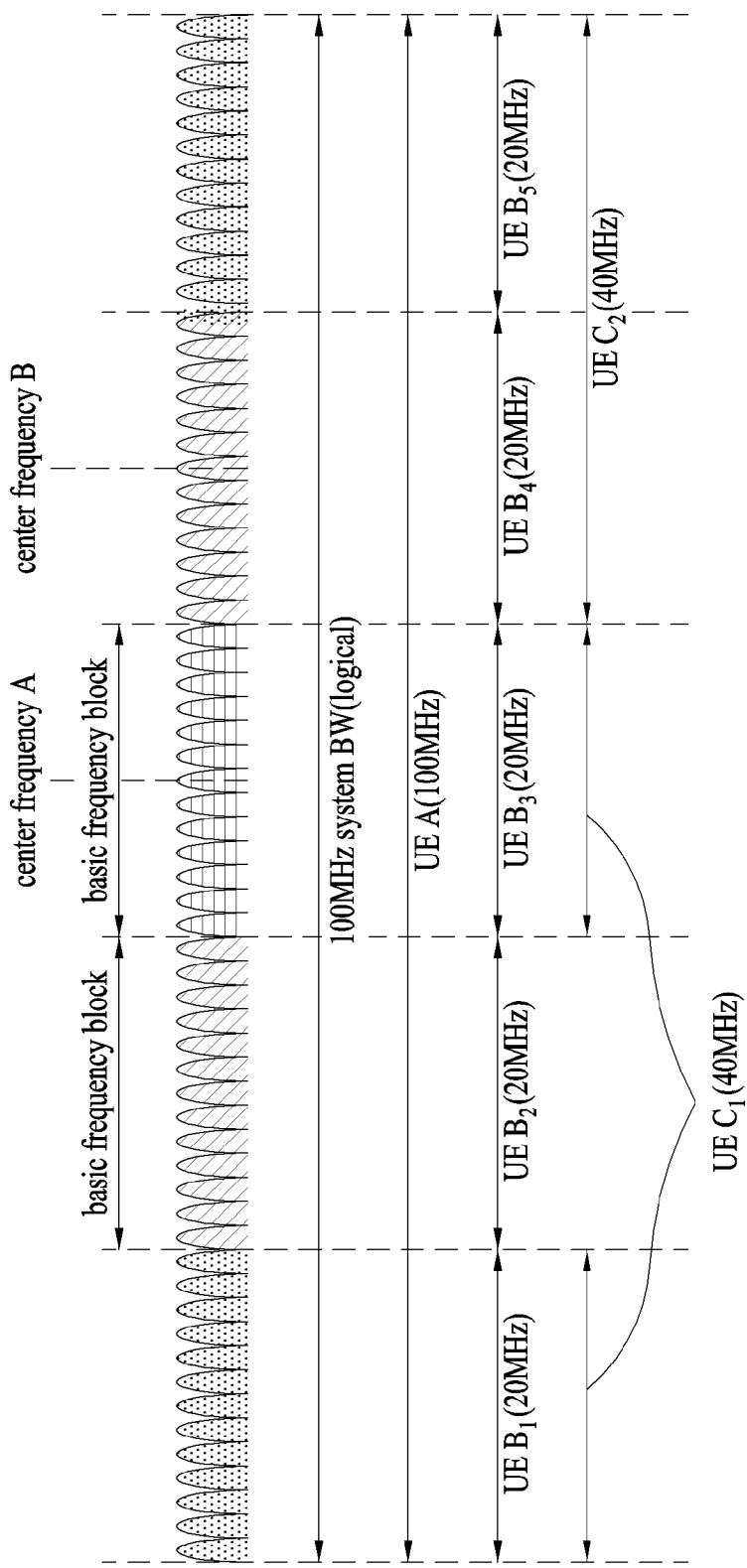
FIG. 5 is a conceptual diagram illustrating a carrier aggregation (CA) scheme.

Carrier aggregation will hereinafter be described in detail. FIG. 5 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 5, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 5, this is only exemplary and the CCs may have different bandwidths. Although the CCs are shown as being contiguous in the frequency domain in FIG. 6, FIG. 6 merely shows the logical concept and thus the CCs may be physically contiguous or separated.

Different center frequencies may be used for the CCs or one common center frequency may be used for physically contiguous CCs. For example, in FIG. 5, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 6:
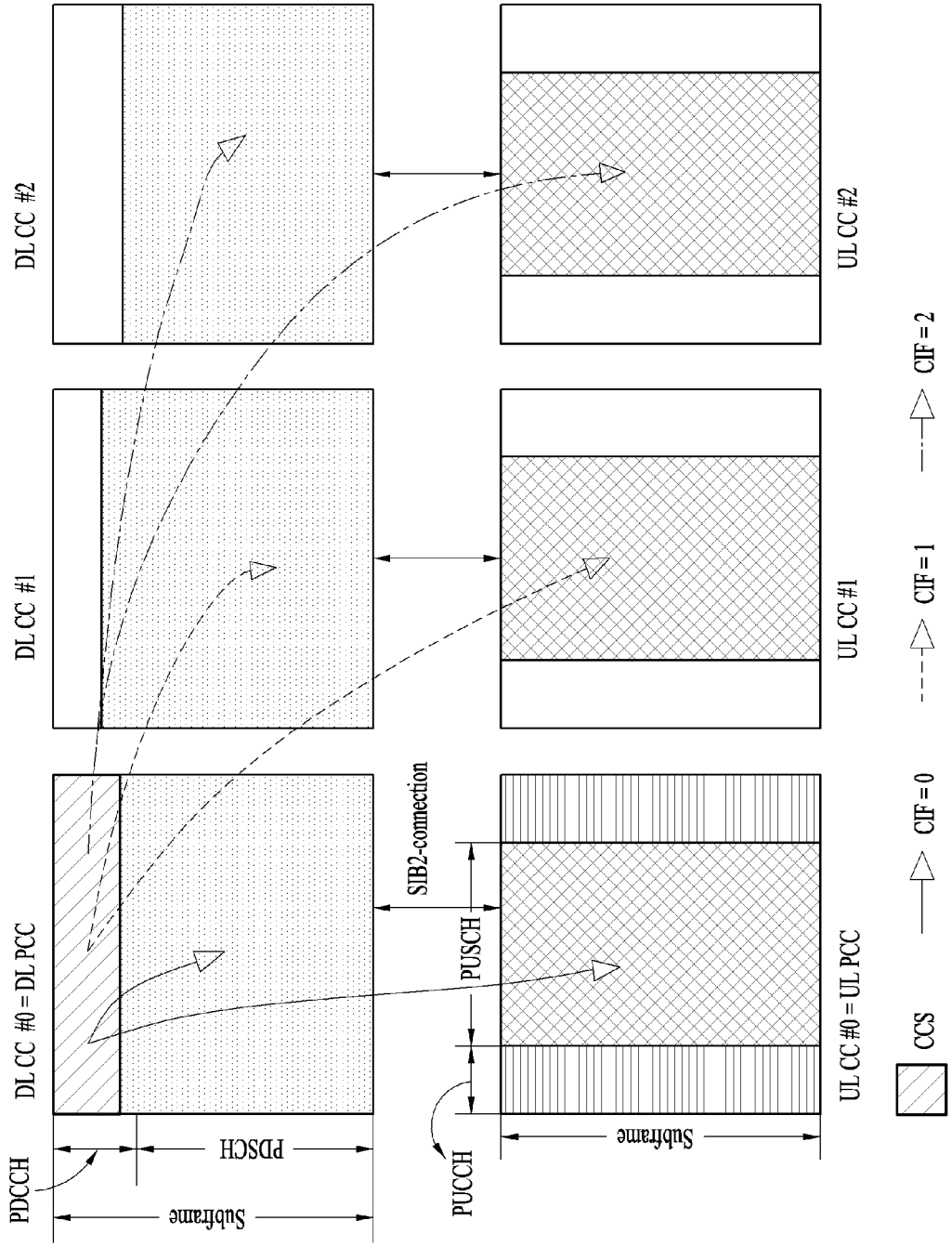
FIG. 6 is a diagram illustrating an application example of a cross-carrier scheduling scheme.

FIG. 6 is a conceptual diagram of a cross carrier scheduling scheme. Specifically, as can be seen from FIG. 6, the number of cells (or CCs) allocated to a relay node (RN) is set to 3, cross carrier scheduling is carried out using a CIF as described above. In this case, it is assumed that a downlink cell (or CC) #0 and a uplink cell (or CC) #0 is set to a primary downlink CC (i.e., a primary cell PCell) and a primary uplink downlink CC, and the remaining CCs are used as secondary cells (SCells).

UE Capabilities

UE radio access capability parameters (hereinafter, referred to as UE capability parameters) are defined in the LTE(-A) system. Those of various kinds of UE capability parameters, which are related to this specification, will be described.

As UE capability parameters related to this specification, there are carrier aggregation (CA) bandwidth class and supportable MIMO capability. First of all, the CA bandwidth class will be described.

Aggregated transmission bandwidth configuration indicates the number of RBs aggregated within aggregated channel bandwidths, all of which are allocated, and each CA bandwidth class will be defined in the following Table.

TABLE 5

| CA bandwidth class | Aggregated Transmission Bandwidth Configuration | Maximum number of CCs | Nominal Guard Band $BW_{GB}$ |
|---|---|---|---|
| A | $N_{RB,agg} \leq 100$ | 1 | $0.05 BW_{Channel(1)}$ |
| B | $N_{RB,agg} \leq 100$ | 2 | FFS |
| C | $100 < N_{RB,agg} \leq 200$ | 2 | $0.05 \max(BW_{Channel(1)}, BW_{Channel(2)})$ |
| D | $200 < N_{RB,agg} \leq [300]$ | FFS | FFS |
| E | $[300] < N_{RB,agg} \leq [400]$ | FFS | FFS |
| F | $[400] < N_{RB,agg} \leq [500]$ | FFS | FFS |

NOTE 1:
$BW_{Channel(1)}$ and $BW_{Channel(2)}$ are channel bandwidths of 2 CCs according to bandwidths (that is, 1.4, 3, 5, 10, 15 and 20 MHz) of possible CC.

Also, the requirements for carrier aggregation in the LTE(-A) system are defined for carrier aggregation configurations with associated bandwidth combination sets. For inter-band carrier aggregation, a carrier aggregation configuration is a combination of operating bands, each supporting a carrier aggregation (CA) bandwidth class. For intra-band contiguous carrier aggregation, a carrier aggregation configuration is a single operating band supporting a carrier aggregation bandwidth class. For each carrier aggregation configuration, requirements are specified for all bandwidth combinations included in a bandwidth combination set, which is indicated per supported band combination in the UE radio access capability. A UE may indicate support of several bandwidth combination sets per band combination. Furthermore, if the UE indicates support of a bandwidth combination set that is a superset of another applicable bandwidth combination set, the applicable bandwidth combination set is supported by the UE even if not indicated.

Requirements for intra-band contiguous CA and requirements for inter-band CA are defined for the carrier aggregation configurations and bandwidth combination sets and respectively specified in Table 5 and Table 7 as follows. The DL CC combinations for a given CA configuration shall be symmetrical in relation to channel center unless stated otherwise in Table 6 and Table 7 below.

TABLE 6

E-UTRA CA configuration/Bandwidth combination set

| E-UTRA CA Configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
|---|---|---|---|---|---|---|
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

NOTE 1:
The CA Configuration refers to an operating band and a CA bandwidth class specified in Table 5 above. Absence of a CA bandwidth class for an operating band implies support of all classes.
NOTE 2:
For the supported CC bandwidth combinations, the CC downlink and uplink bandwidths are equal.

TABLE 7

E-UTRA CA configuration/Bandwidth combination set

| E-UTRA CA Configuration | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|
| CA_1A-5A | 1 | | | | Yes | | | 20 | 0 |
| | 5 | | | Yes | | | | | |
| CA_1A-18A | 1 | | | Yes | Yes | Yes | Yes | 35 | 0 |
| | 18 | | | Yes | Yes | Yes | | | |
| CA_1A-19A | 1 | | | Yes | Yes | Yes | Yes | 35 | 0 |
| | 19 | | | Yes | Yes | Yes | | | |
| CA_1A-21A | 1 | | | Yes | Yes | Yes | Yes | 35 | 0 |
| | 21 | | | Yes | Yes | Yes | | | |
| CA_2A-17A | 2 | | | Yes | Yes | | | 20 | 0 |
| | 17 | | | Yes | Yes | | | | |
| CA_2A-29A | 2 | | | Yes | Yes | | | 20 | 0 |
| | 29 | Yes | Yes | Yes | | | | | |
| CA_3A-5A | 3 | | | Yes | Yes | Yes | | 30 | 0 |
| | 5 | | Yes | Yes | | | | | |
| | 3 | | | Yes | | | | 20 | 1 |
| | 5 | | Yes | Yes | | | | | |
| CA_3A-7A | 3 | | Yes | Yes | Yes | Yes | | 40 | 0 |
| | 7 | | | Yes | Yes | Yes | | | |
| CA_3A-8A | 3 | | | Yes | Yes | Yes | | 30 | 0 |
| | 8 | | Yes | Yes | | | | | |
| | 3 | | | Yes | | | | 20 | 1 |
| | 8 | | Yes | Yes | | | | | |

TABLE 7-continued

E-UTRA CA configuration/Bandwidth combination set

| E-UTRA CA Configuration | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|
| CA_3A-20A | 3 | | | Yes | Yes | Yes | Yes | 30 | 0 |
| | 20 | | | Yes | Yes | | | | |
| CA_4A-5A | 4 | | | Yes | Yes | | | 20 | 0 |
| | 5 | | | Yes | Yes | | | | |
| CA_4A-7A | 4 | | | Yes | Yes | | | 30 | 0 |
| | 7 | | | Yes | Yes | Yes | Yes | | |
| CA_4A-12A | 4 | Yes | Yes | Yes | Yes | | | 20 | 0 |
| | 12 | | | Yes | Yes | | | | |
| CA_4A-13A | 4 | | | Yes | Yes | Yes | Yes | 30 | 0 |
| | 13 | | | | Yes | | | | |
| | 4 | | | Yes | Yes | | | 20 | 1 |
| | 13 | | | | Yes | | | | |
| CA_4A-17A | 4 | | | Yes | Yes | | | 20 | 0 |
| | 17 | | | Yes | Yes | | | | |
| CA_4A-29A | 4 | | | Yes | Yes | | | 20 | 0 |
| | 29 | | Yes | Yes | Yes | | | | |
| CA_5A-12A | 5 | | | Yes | Yes | | | 20 | 0 |
| | 12 | | | Yes | Yes | | | | |
| CA_5A-17A | 5 | | | Yes | Yes | | | 20 | 0 |
| | 17 | | | Yes | Yes | | | | |
| CA_7A-20A | 7 | | | Yes | Yes | Yes | Yes | 30 | 0 |
| | 20 | | | Yes | Yes | | | | |
| CA_8A-20A | 8 | | | Yes | Yes | | | 20 | 0 |
| | 20 | | | Yes | Yes | | | | |
| CA_11A-18A | 11 | | | Yes | Yes | | | 25 | 0 |
| | 18 | | | Yes | Yes | Yes | | | |

NOTE 1:
The CA Configuration refers to a combination of an operating band and a CA bandwidth class specified in Table 5 above. Absence of a CA bandwidth class for an operating band implies support of all classes.
NOTE 2:
For each band combination, all combinations of indicated bandwidths belong to the set.
NOTE 3:
For the supported CC bandwidth combinations, the CC downlink and uplink bandwidths are equal.

Furthermore, the supportable MIMO capability refers to the number of layers for spatial multiplexing that may be supported by the UE. In case of DL, the number of supportable layers is 2, 4, or 8.

CoMP (Coordinated Multiple Point) Transmission and Reception Operation

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

Enhanced-PDCCH (EPDCCH)

In LTE after LTE Release 11, an enhanced-PDCCH (EPDCCH) which can be transmitted through the existing PDSCH region is considered as a solution to lack of capacity of a PDCCH caused by coordinated multi-point (CoMP), multi-user-multiple input multiple output (MU-MIMO), and the like and degradation of PDCCH performance caused by inter-cell interference. In addition, in the case of EPDCCH, channel estimation may be performed based on DMRSs in order to obtain a pre-coding gain, in contrast with the case of the existing CRS-based PDCCH.

EPDCCH transmission may be divided into localized EPDCCH transmission and distributed EPDCCH transmission according to configuration of a PRB pair used for EPDCCH transmission. Localized EPDCCH transmission represents a case in which resource sets used for transmission of an EPDCCH neighbor each other in the frequency domain, and precoding may be applied to obtain a beamforming gain. For example, localized EPDCCH transmission may be based on consecutive ECCEs, the number of which corresponds to an aggregation level. On the other hand, distributed EPDCCH transmission represents transmission of an EPDCCH in a separated PRB pair in the frequency domain, and has a gain in terms of frequency diversity. For example, distributed EPDCCH transmission may be based on the ECCE having four EREGs included in each PRB pair separated in the frequency domain.

A UE may perform blind decoding similar to the blind decoding performed in the legacy LTE/LTE-A system, in order to receive/acquire DCI through an EPDCCH. More specifically, the UE may attempt to decode (or monitor) a set of EPDCCH candidates according to each aggregation level to obtain DCI formats corresponding to a set transmission mode. Herein, the set of EPDCCH candidates to be monitored may be referred to as an EPDCCH USS. This search space may be configured/constructed according to each aggregation level. In addition, aggregation levels 1, 2, 4, 8, 16 and 32, which are more or less different from the aggregation levels for the legacy LTE/LTE-A system, are applicable according to the subframe type, the CP length, the quantity of resources available in a PRB pair, and the like.

For a UE for which EPDCCH is configured, REs included in a PRB pair set are indexed by EREGs, which are in turn indexed by ECCEs. EPDCCH candidates constituting a search space may be determined based on the indexed ECCEs and be subjected to blind decoding. Thereby, control information may be received. Herein, the EREG corresponds to the REG of legacy LTE/LTE-A, and the ECCE corresponds to the CCE. One PRB pair may include 16 EREGs.

For each serving cell, one UE may configure one or two EPDCCH PRB sets for monitoring PDCCH through higher layer signaling.

In 3GPP LTE Rel-11, a UE to which the CoMP technique is applied may estimate a channel for TPs potentially capable of participating in CoMP using channel state information reference signal (CSI-RS) resources defined as a CoMP measurement set, and feeds back CSI including a precoding matrix indicator (PMI), a channel quality indicator (CQI), and a rank indicator (RI) to a serving cell thereof based on the value of the estimated channel. Based on the fed back CSI information, the network may configure a dynamic point selection (DPS) technique of selecting a TP whose channel has a relatively good quality and causing the selected TP to transmit data to the UE, a coordinated scheduling/coordinated beamforming (CS/CB) technique by which TPs which actually participate in CoMP control scheduling and beamforming to attenuate mutual interference, and a joint transmission (JT) technique, by which TPs which actually participate in CoMP transmit the same data to the UE.

The present invention relates to information provided by a network (or eNB) to improve received signal performance of a UE provided with a high performance receiver, which has interference cancellation (IC) capability, and a cooperative scheme between networks.

A downlink CoMP scheme is to configure transmission beams to minimize inter-cell interference and intra-cell interference in a transmitter on the basis of channel state information reported from a receiver. In the downlink CoMP scheme, complexity of the UE during data reception is not increased significantly but performance of the CoMP scheme depends on accuracy in reporting of the channel state information. Unlike the downlink CoMP scheme, the high performance reception scheme is to obtain better reception performance by using features of an interfering signal in the receiver. In the high performance reception scheme, it is important how the UE obtains information on the interfering signal which is transmitted together with a signal (that is, desired signal) scheduled thereto. Main examples of the high performance reception scheme include:

linear MMSE IRC receiver;
maximum likelihood detection receiver; and
interference cancellation receiver.

If the receiver has better performance, the receiver needs information on more interfering signals. For example, an iterative decoding interference cancellation receiver which is known as a receiver having the best performance needs information for decoding of the interfering signal because the UE should regenerate the interfering signal to decode the interfering signal and cancel interference.

In order to cancel the interfering signal, the receiver should have a detection capability. That is, the receiver may stably perform interference cancellation only if decoding is successfully performed for interference packets or a hard decision error probability of transmission coded symbols of the interference packets is a given value or less. Therefore, the UE affected by interference should determine a modulation coding scheme (MCS) of the interfering signal to stably receive the interfering signal. That is, the MCS of each transmitting signal should be determined such that both an interfered UE and an interfering UE (that is, UE intended/scheduled to receive a signal that interferes with the interfered UE) may stably receive the signal.

For cancellation of the interfering signal, there are provided a scheme for discovering an interfering signal by simply decoding the interfering signal and then cancelling the amount of interference equivalent to the discovered interfering signal to improve received performance of a desired signal and a scheme for regenerating and canceling an interfering signal after decoding the interfering signal. In the present invention, the former scheme will be referred to as a demodulation based IC method (that is, symbol level IC), and the latter scheme will be referred to as a decoding based IC method (that is, bit level IC).

In case of the demodulation based IC method, an interfering signal is not decoded but demodulated and then interference is cancelled. Particularly, if a PDSCH of the interfering signal is transmitted based on a DM-RS, interference may be cancelled using the DM-RS. That is, if a PDSCH co-scheduled to RB to which a desired signal is scheduled is an interfering signal, eNB should provide the UE with information on the interfering signal to cancel interference for the interfering signal. In order to estimate an interference level by using the DM-RS, the UE should know a sequence of the DM-RS of the interfering signal. To this end, the eNB may provide the UE with seed information of the DM-RS sequence of the interfering signal. In this case, the DM-RS sequence may be one or more, and the eNB may provide the UE with a set of candidates of seed information of the DM-RS sequence for an interfering signal which is likely to interfere with the UE. The UE that has received the seed information of the DM-RS sequence may generate the DM-RS sequence by using the corresponding seed information and estimate interference on the basis of the generated DM-RS sequence. The UE cancels the estimated interference from the received signal and, as a result, if the status of the received channel has been improved (for example, if better SNR is obtained after interference is cancelled), the UE may recognize the signal corresponding to the generated DM-RS sequence as the interfering signal, and may receive its PDSCH by demodulating the received signal from which the estimated interfering signal is cancelled. The UE may perform the interference estimation and the interference cancellation as much as the number of kinds of seed information of the received DM-RS sequence.

On the other hand, for decoding based IC, the UE should decode the interfering signal and thus needs more information on the interfering signal. Information required to decode the interfering signal is almost the same as information required for the UE to decode the desired signal. In the LTE(-A) system, the eNB transfers the information required to decode the PDSCH, which is the desired signal, to the UE through DCI of a PDCCH. The PDCCH which is transmitted includes CRC parity bits to detect an error. In order to indicate a UE to which the corresponding PDCCH is transmitted, the CRC parity bits are transmitted by being scrambled with C-RNTI given to the UE. The UE performs PDCCH blind decoding of a plurality of number of times on a PDCCH search space given thereto, and determines that DCI within the corresponding PDCCH has PDSCH scheduling information transmitted to the UE if CRC of the decoding result is the same as C-RNTI allocated to the UE.

Therefore, the eNB may transmit C-RNTI of another UE (that is, UE intended to receive a signal which is likely to interfere with a specific UE) to the specific UE, and the specific UE that has received the C-RNTI may perform blind decoding for the PDCCH by using the received C-RNTI and receive DCI scheduled for the another UE through such blind decoding. The specific UE may receive and regenerate the interfering signal on the basis of the DCI, and may receive the PDSCH scheduled thereto after canceling the regenerated interfering signal from the received signal.

In an SU-MIMO transmission scheme of the LTE(-A) system, when two or more layers are transmitted, for application interference cancellation between the layers, two transport blocks (TBs) are transmitted. If decoding of one of two TBs is successfully performed, the UE regenerates a transmitting signal of the corresponding TB to cancel the transmitting signal from the received signal and again performs decoding for another TB in an environment that interference between layers is cancelled. To this end, DCI of the SU-MIMO includes MCS information for each of TB1 and TB2, NDI (new data indicator), and RV (redundancy version).

Information transferred through the PDCCH includes DCI and CRC masked with C-RNTI. A configuration of the DCI is varied depending on a DCI format based on a PDSCH transmission mode. The DCI includes an information field for resource allocation (RA), HARQ process, TPC and layer mapping, and a field for information transfer of MCS, NDI and RV of each TB.

The present invention relates to a method for cancellation of an interfering signal in a UE by selectively using or mutually combining the demodulation based IC scheme and the decoding based IC scheme in accordance with UE capability and in accordance with the number of layers scheduled to the UE or the number of codewords (the number of transport blocks) at a corresponding subframe.

One of main references for selecting the demodulation based IC scheme and the decoding based IC scheme, which are suggested in the present invention, in the UE is related to PDCCH decoding capability of the UE. For IC, the decoding based IC scheme has complexity a little higher than that of the demodulation based IC scheme. This is because that DCI of the interfering signal should be decoded to decode the interfering signal and the interfering signal should be regenerated to cancel interference from the received signal. On the other hand, in case of demodulation IC, DCI of the interfering signal is not required, and interference is cancelled by estimation only for the interfering channel after demodulation.

In this specification, PDCCH decoding capability of the UE relates to how many times the UE may perform blind search and decoding for the PDCCH within one subframe, and means that there is no problem in ACK/NACK transmission to an uplink within a given time through reception, demodulation and decoding for the PDSCH after blind search and decoding for the PDCCH. The UE should perform blind search for the PDCCH to decode the PDSCH transmitted thereto, and if the number of times for blind search is increased, complexity of the UE is increased, and if too much blind search is performed, a problem in PDSCH reception performance may occur at the corresponding subframe.

The post-3GPP LTE Rel-10 system supports carrier aggregation (CA) that allows the eNB or UE to transmit and receive a signal by using a plurality of component carriers (CCs). Each CC may be categorized into a PDCCH region and a PDSCH region. The UE should blind search for (e)PDCCH region of a plurality of CCs every subframe to receive downlink signals from the plurality of CCs. Hereinafter, control information on the PDSCH or the PDCCH includes both PDCCH and ePDCCH. For example, if the UE may support 3 DL CCs, it is to be understood that the corresponding UE may perform blind search at PDCCHs of 3 DL CCs at one subframe and has PDCCH decoding capability of three times as compared with UE that cannot support CA.

Therefore, UE capability parameters associated with the PDCCH decoding capability for determining whether to use the demodulation based IC scheme or the decoding based IC scheme will be described as follows, and the operation of the UE and the eNB based on the UE capability parameters will be described.

Maximum Number of CCs

If the eNB does not configure CA for the UE having CA capability, and when the eNB schedules PDSCH to the corresponding UE, a method for using CA capability of the UE to increase capacity of the corresponding UE will be suggested.

If the number of CAs that may be supported by the UE is N, PDCCH decoding capability, that is, the number of PDCCHs that may be decoded may be regarded as N. When the eNB transmits the PDSCH to the corresponding UE without configuring downlink CA to the corresponding UE, the eNB may provide the UE with information on a dominant interference signal to increase received performance of the PDSCH corresponding to the desired signal, whereby interference cancellation/mitigation may be performed for the corresponding signal. Particularly, the amount of control information on the interfering signal notified to the UE may be varied depending on PDCCH decoding capability of the UE. As a result, in order that the corresponding UE may decode the interfering signal in addition to control information for its PDSCH decoding and then cancel the interfering signal, the UE may decode the PDCCH of the interfering signal on the basis of the control information on the interfering signal.

For example, if a serving cell does not configure CA for the UE that may aggregate 2 CCs, the serving cell may transmit the PDSCH to the UE through one carrier. In this case, the serving cell may transmit control information on one dominant interfering signal together with the PDSCH. Also, the serving cell may signal that CA is not configured for the UE. The control information on the interfering signal may be transmitted together with control information on the desired signal. The UE demodulates and decodes the interfering signal by using the control information on the interfering signal which is signaled, regenerates the interfering signal and then cancels the corresponding interfering signal from the received signal, thereby improving received performance of the desired signal. That is, if the eNB does not configure CA for the UE having CA capability, the eNB may switch and reinterpret the CA capability of the UE as network-assisted interference cancellation and suppression capability for the received signal. Meanwhile, for this switch and reinterpretation, the eNB may separately signal that the CA has not been configured or the switch and reinterpretation may be assumed.

If the UE receives information on a signal to another UE in addition to the desired signal, after performing demodulation and decoding by using the received information and regenerating the interfering signal (that is, signal to another UE), the UE should regard the regenerated interfering signal as the interfering signal and extract the interfering signal from the received signal. The control information on the interfering signal provided to the UE is similar to a field of control information (DCI) for desired PDSCH.

In other words, the UE reports its capability (that is, aforementioned "UE capability") to the network. In this case, the UE may report CA capability described in the embodiment(s) of the present invention. Particularly, the UE should report supportable CA bandwidth class and MIMO capability per band per band combination.

The CA bandwidth class indicates aggregated full transmission band, the maximum number of component carriers (CCs), and a nominal guard band as illustrated in Table 5. That is, if the CA bandwidth class is C, an aggregated transmission bandwidth is greater than 100 RB and is 200 RB or less, and the maximum number of CCs is limited to 2. The UE may report supportable CA capability to the network as information on the CA bandwidth class.

MIMO capability includes DL MIMO capability and UL MIMO capability. The UE selects one of {2, 4, 8} as the number of supportable MIMO layers and reports DL MIMO capability to the network. The MIMO capability is equally applied to all carriers at each band of each band combination. However, the MIMO capability is limited to UE that has reported CA-MIMO capability, and is not limited to UE corresponding to UE category 1 (the number of supportable layers=1). The CA-MIMO capability at each band of each band combination should necessarily satisfy processing requirements (that is, the maximum number of DL-SCH/UL-SCH transport block bits received/transmitted within TTI, a total number of soft channel bits for downlink, etc.) defined by physical layer parameters of the UE category.

The UE that has reported CA-MIMO capability basically has PDCCH decoding capability equivalent to the maximum number of CCs corresponding to the CA bandwidth class per band of each band combination. That is, if PDCCH decoding capability of a non-CA capable UE that fails to support CA is 1 and a specific UE has reported its CA bandwidth class as 'c' (the maximum number of supportable CCs=2), PDCCH decoding capability of the corresponding UE may be regarded as 2. If the eNB has not configured CA for the UE, the eNB allows 1 of PDCCH decoding capability of the UE to be used for PDCCH decoding for receiving the PDSCH for the corresponding UE but may switch PDCCH decoding capability corresponding to the other 1 to be used for PDCCH decoding for the interfering signal. If a capability capable of blind decoding for the PDCCH of the interfering signal, decoding PDSCH of the interfering signal by using the blind-decoded PDCCH and canceling the decoded PDSCH is defined as network assisted interference cancellation (NAIC) capability, the eNB may use the corresponding capability by switching CA capability of the UE, which is reported per band of each band combination, to NAIC capability per band of each band combination depending on whether the eNB has configured CA for the corresponding UE. At this time, the NAIC capability is a capability capable of blind decoding for the PDCCH of the interfering signal and decoding PDSCH corresponding to the blind-decoded PDCCH at the corresponding subframe, and may be quantized like a concept of the maximum number of supportable CCs.

Generally, the UE may respectively report a plurality of CA-MIMO capabilities depending on its supportable CA configuration. In this case, the UE may report the plurality of CA-MIMO capabilities per band of each band combination. That is, if the UE that has reported CA bandwidth class='c' may support a single CC without configuring CA, the UE may additionally report CA-MIMO capability. At this time, CA bandwidth class='a', and the maximum number of supportable CCs corresponding to the CA bandwidth class='a' is 1. Therefore, when a capability as to how the UE may perform PDCCH decoding is calculated, a value of which maximum number of supportable CCs corresponding to each of a plurality of CA bandwidth classes reported by the corresponding UE is the greatest may be regarded as the capability of the UE that may perform PDCCH blind decoding. That is, the NAIC capability of the UE corresponds to the greatest value of the maximum number of supportable CCs corresponding to the reported CA bandwidth class. More exactly, a value except PDCCH decoding capability of a signal of the UE may be regarded as the NAIC capability. For example, if PDCCH decoding capability of the UE is 2 and the eNB does not configure CA for the UE, actual NAIC capability is 1.

If a value corresponding to a maximum value among the maximum number of supportable CCs corresponding to the plurality of CA bandwidth classes reported by the UE is $N_{CC}$, that is, if $\text{Max}_i$ {maximum_number of reported_supportable_CCs (CA_bandwidth_class$_i$)}=$N_{CC}$, and the eNB configures N (N<=$N_{CC}$) number of CAs for the corresponding UE, PDCCH decoding capability ($N_{PDCCH}$) of the UE is $N_{CC}$, and NAIC capability may be $N_{CC}$–N. That is, the eNB understands the value corresponding to $N_{CC}$–N as NAIC capability of the corresponding UE, and provides the corresponding UE with necessary information to allow the corresponding UE to cancel the interfering signal as much as the amount corresponding to the corresponding value.

As another embodiment, the UE may report NAIC capability per band of each band combination. In this case, the UE may report the maximum number $N_{PDCCH}$ of supportable CCs at the corresponding band within the corresponding band combination, which corresponds to a capability capable of decoding the PDCCH, as NAIC capability. This value cannot be greater than the aforementioned $N_{CC}$. Actual NAIC capability of the UE is varied depending on how many CCs are aggregated for the corresponding UE, and if N number of CCs are aggregated for the UE, the NAIC capability of the UE is $N_{PDCCH}$–N.

The Number of Layers

The DL MIMO capability reported by the UE is the number of supportable MIMO layers as described above, and the UE selects one value of {2, 4, 8} and reports the selected value. All UEs except UE category 1 should report a value of 2 layers or more as DL MIMO capability. At this time, MIMO capability reported by the UE is a value equally applied to all CCs of each band of each band combination. That is, in case of UE that has reported DL MIMO capability per band per band combination as 4 layers, CCs at the corresponding band, for example, when CC1, CC2 and CC3 exist, DL MIMO capability at each of CC1, CC2 and CC3 is 4 layers. As described above, the eNB may switch the CA capability of the UE to the NAIC capability if the eNB does not configure CA for the CA capable UE. However, MIMO capability as the number of supportable layers cannot be switched. For example, it is assumed that a specific UE reports its CA-MIMO capability as follows.

*CA-BandwidthClass = c*

*MIMO-CapabilityDL = eight layers*

...

*CA-BandwidthClass = a*

*MIMO-CapabilityDL = four layers*

In this case, $N_{CC}$ of the corresponding UE is 2. If the eNB aggregates N number of carriers for the UE, NAIC capability=$N_{CC}$–N.

Alternatively, the UE may separately report a capability, $N_{PDCCH}$=2, which is capable of decoding PDCCH for each band of each band combination. Likewise, if the eNB aggregates N number of carriers for the UE, NAIC capability=$N_{PDCCH}$–N.

If the CA is not configured for the UE, the UE has PDCCH decoding capability of two times more than that of the non-CA capable UE. Therefore, the eNB may provide the UE with C-RNTI of a specific UE to cancel interference and allow the UE to perform blind decoding for the PDCCH of the interfering signal.

If the eNB does not configure CA for the corresponding UE and transmits a desired signal to the corresponding UE through 4 layers, the UE uses its all supportable layers to decode its signal in a non-CA status, whereby the UE cannot decode the PDSCH for the interfering signal. Therefore, in this case, if interfering signal related control information is provided to the UE, unnecessary control information is provided to the UE, and the UE unnecessarily performs PDCCH blind decoding for the interfering signal. That is, in this case, the UE should perform cancellation of the interfering signal by using the demodulation based IC scheme not the decoding based IC scheme.

In other words, the capability of the UE, which is capable of canceling interference, that is, NAIC capability is restricted by the maximum number ($N_{LAYERS}$) of layers, which may be used by the UE to decode the PDSCH, as well as PDCCH decoding capability of the UE, and $N_{LAYERS} \leq 8N_{PDCCH}$. Therefore, when providing information assisted for interference cancellation to the specific UE, the eNB provides the specific UE with the corresponding information considering PDCCH decoding capability of the UE, the number $N_{LAYERS}$ of supportable layers as well as $N_{PDCCH}$ (generally, $N_{PDCCH}=N_{CC}$). When scheduling the desired signal to the specific UE, the eNB provides the desired signal as far as the number ($n_{LAYERS}$) of layers to which the corresponding signal is transmitted is smaller than the maximum number ($N_{LAYERS}$) of supportable layers.

The Number of Transport Blocks/Codewords

Additionally, the NAIC capability of the UE is restricted by the maximum number of layers that may be supported by the UE and depending on how many transport blocks may be used for decoding. In the legacy 3GPP LTE system, the UE that has reported MIMO capability should receive maximum 2 transport blocks (hereinafter, used as the same meaning as that of codewords) regardless of the maximum number of supportable layers, which is reported by the UE. The maximum number $N_{CW}$ of decodable codewords of the UE that has reported MIMO capability without separate signaling may be regarded as 2, and $N_{CW} \leq 2N_{CC}(=2N_{PDCCH})$. The maximum number $N_{CW}$ of supportable (decodable) codewords of the UE may be shared by CCs at each band of each band combination.

After decoding the PDCCH, the UE may perform PDSCH decoding for 2 transport blocks. The interference cancellation receiver of the decoding based IC scheme should cancel the interfering signal from the received signal after decoding the PDSCH equally even for the interfering signal. For example, if the specific UE has PDCCH decoding capability of 2 and the maximum number of supportable codewords of 2, the corresponding UE should perform blind decoding for the PDCCH using its C-RNTI and once more perform blind decoding for the PDCCH using C-RNTI of UE (hereinafter, for convenience of description, referred to as "interfering UE") intended to receive the interfering signal from the eNB. Even though PDCCH blind decoding for the interfering signal is successfully performed, if the desired signal of the UE is transmitted by 2 codewords, the UE should perform PDSCH decoding for 2 codewords and thus cannot perform PDSCH decoding for the interfering signal within a given time, whereby interference cancellation cannot be performed. In this case, interference cancellation of the decoding based IC scheme is not performed, and interference cancellation of demodulation based IC scheme may only be performed using the PDCCH of the decoded interfering signal.

Therefore, the eNB may consider PDCCH decoding capability of the UE, $N_{PDCCH}$ (=$N_{CC}$), the maximum number $N_{LAYERS}$ of supportable layers, and the maximum number $N_{CW}$ of codewords that may be supported by the UE when providing information assisted for interference cancellation to the specific UE. When scheduling the desired signal to the specific UE, the eNB provides control information for interference cancellation as far as the number $n_{CW}$ of codewords of the corresponding signal is smaller than the maximum number $N_{CW}$ of supportable layers of the UE.

As another embodiment of the present invention, a scheme of reporting how many codewords may be used for PDSCH decoding as NAIC capability of the UE, that is, a scheme of reporting the maximum number $N_{CW}$ of supportable codewords separately from the number of supportable layers as MIMO capability of the UE is suggested. The UE may report $N_{CW}$ per band per band combination equally to CA capability of the UE. At this time, the maximum number $N_{CW}$ of supportable codewords of the UE may be shared by CCs per band per band combination, and the maximum number $N_{CW}$ of supportable codewords of the UE is limited to the maximum number $N_{CW}$ of codewords reported by the UE per band per band combination regardless of CA configuration at the corresponding band.

The maximum number of supportable transport blocks reported by the UE per band per band combination may be used for decoding based IC of the interfering signal and also used usefully even in the case that the number of transport blocks scheduled to the UE advanced in an advanced system. Therefore, it is preferable that the maximum number of supportable transport blocks is reported by the UE as one of MIMO capabilities separately from the maximum number of supportable layers.

As still another embodiment, the maximum number $N_{CW}$ of codewords that may be supported by the UE may be reported per band of each band combination. At this time, the maximum number of codewords that may be supported by the UE at the corresponding band may be varied depending on CA configuration.

Time Advanced (TA) Value

The eNB may provide control information for interference cancellation or restrict interference cancellation operation of the UE even though the UE has capability of interference cancellation depending on scheduling to the corresponding UE at the corresponding subframe by using NAIC capability of the UE. However, the UE spaced apart from the eNB, having a timing advanced (TA) value of a specific value or more should have limitation in performing capability of interference cancellation. The UE scheduled to a downlink should receive, demodulate and decode its desired signal and transmit ACK or NACK to an uplink in accordance with the demodulated and decoded result within a given time. Generally, the UE having a great TA value has no enough time required to process the received data. Therefore, it is not preferable the UE is commanded to decode the interfering signal, and if the TA value of the UE is a specific value or more ($T_{TA} \geq T_{TA\_Threshold}$), the UE is preferably restricted in decoding the interfering signal.

The UE capability parameters for determining the IC scheme of the UE (or receiver of the UE) have been described as above. An IC scheme selected on the basis of the UE capability parameters and a scheme how to command the UE to perform the selected IC scheme will be described.

Signaling of NAIC Information

When the eNB provides information on the interfering signal to allow the specific UE to cancel the interfering signal, it is preferable that the control information is provided only if the aforementioned conditions are satisfied. That is, the eNB provides the control information on the interfering signal to allow the UE to perform interference cancellation only if four conditions are satisfied as follows.

For example, information for detecting DCI of the interfering signal, that is, C-RNTI of interfering UEs may be provided to the above UE. In more detail, the system or the eNB may configure C-RNTI set of interfering UEs predicted to interfere with each UE and indicate a specific C-RNTI or specific C-RNTI set through higher layer signaling such as RRC signaling. Also, the size of the C-RNTI set may be determined in accordance with UE capability of each UE.

Also, if the following four conditions are all satisfied, the eNB may perform signaling for commanding the corresponding UE to perform IC operation.

$N_{PDCCH} - N \geq 1$ or $N_{CC} - N \geq 1$        [Condition 1]

$N_{LAYERS} - n_{LAYERS} \geq 1$        [Condition 2]

$N_{CW} - n_{CW} \geq 1$        [Condition 3]

$T_{TA} \leq T_{TA\_Threshold}$        [Condition 4]

In this case, $N_{PDCCH}$ (or $N_{CC}$) means PDCCH decoding capability (or the maximum number of supportable CCs) of the UE, N means the number of carrier aggregations configured for the specific UE by the eNB at a scheduling time or the number of carriers to be monitored by the UE, $n_{LAYER}$ means the number of layers to which a desired signal scheduled to the corresponding UE is transmitted, and $n_{CW}$ means the number of codewords of the desired signal scheduled to the corresponding UE. Also, each of $N_{PDCCH}$, N, $N_{LAYERS}$, $n_{LAYERS}$, $N_{CW}$ and $n_{CW}$ is an integer more than 1.

If the four conditions listed as above are all satisfied, the eNB may command the UE to decode the interfering signal and cancel the interfering signal from the received signal and provide information required for cancellation of the interfering signal. However, if some of the four conditions are satisfied but the other some are not satisfied, the eNB may provide the UE with information to differently cancel interference.

For example, if the following conditions are provided by capability of the specific UE and actual scheduling, that is, in case of $N_{PDCCH} - N \geq 1$, $N_{LAYERS} - n_{LAYERS} \geq 1$ but $N_{CW} - n_{CW} = 0$, the eNB may provide information on the interfering signal to allow the corresponding UE to perform interference cancellation of the demodulation based IC scheme not the decoding based IC scheme.

That is, since the conditions 1 and 2 are satisfied, the eNB may provide the UE with information (for example, C-RNTI of interfering UE) on the interfering signal to allow the corresponding UE to additionally decode the PDCCH of the interfering signal. The UE that has successfully performed PDCCH decoding for the interfering signal may know information on MCS of the interfering signal, resource allocation, and the number of layers, and may decode the interfering signal by using the information, whereby the UE may identify where the interfering signal is located on constellation, and may cancel the interfering signal from the entire signal.

The eNB may command the UE having a receiver that may perform the decoding based IC scheme to perform the demodulation based IC scheme in accordance with scheduling at a specific time. The eNB may command the UE to perform the demodulation based IC scheme when the conditions 1 and 2 are satisfied but the condition 3 is not satisfied. Of course, the condition 4 should be satisfied in order that the eNB may command the UE to perform the demodulation based IC scheme. However, even in the case that the conditions 1 to 3 are satisfied but the condition 4 is not satisfied, the eNB may command the UE to perform the demodulation based IC scheme not the decoding based IC scheme. Alternatively, the UE may separately report to the eNB whether the UE has performed the decoding based IC scheme or the demodulation based IC scheme under the given conditions by using given information.

Figure 7:
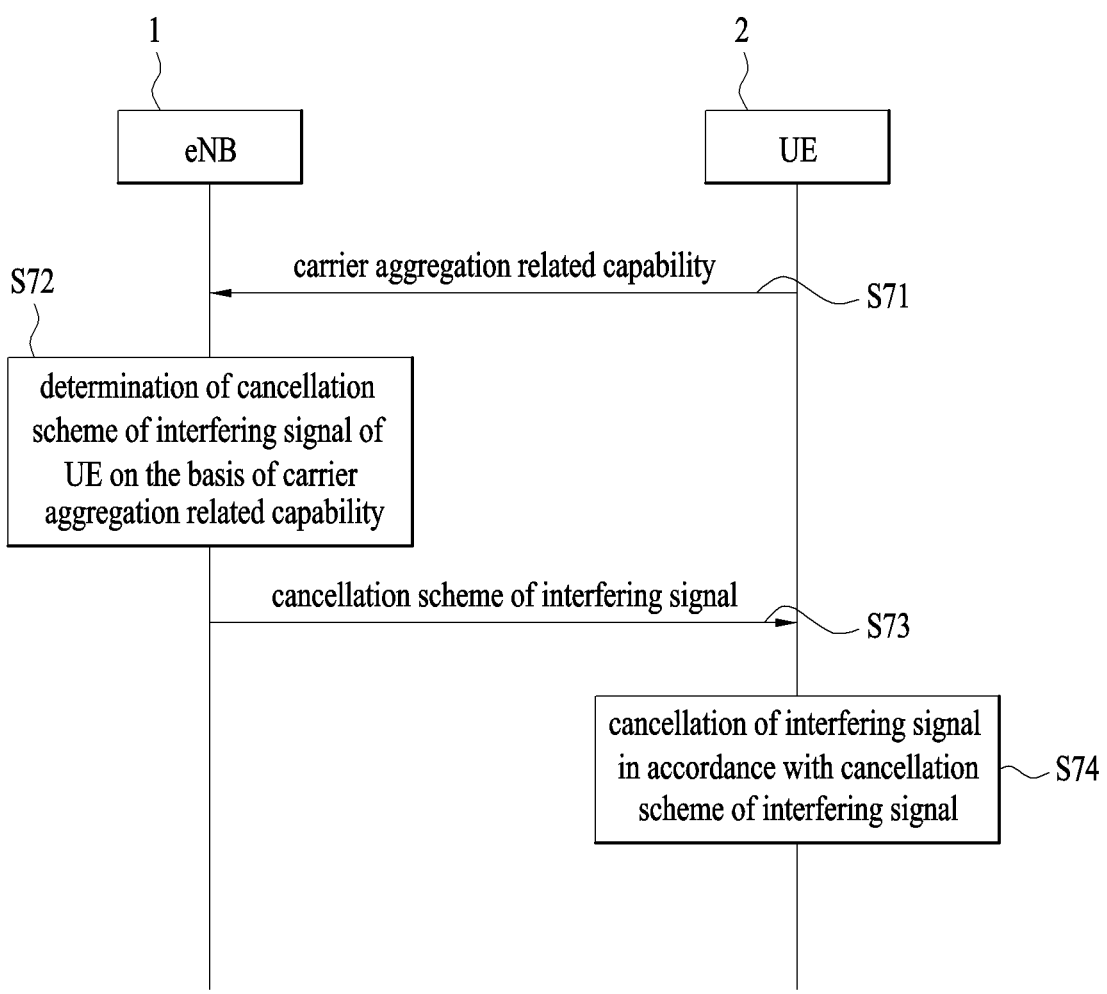
FIG. 7 is a flow chart according to the embodiment(s) of the present invention.

FIG. 7 is a flow chart according to the embodiment(s) of the present invention. eNB (1) may receive information on carrier aggregation (CA) related capability of the UE from UE(2) (S71). The information on CA related capability may include CA bandwidth class of the UE and information on MIMO capability. If the information on CA related capability is received, the eNB (1) may determine a cancellation scheme of the interfering signal of the UE on the basis of the information (S72). The step S72 may be performed on the basis of information on UE, which is reported by the aforementioned UE or acquired by the eNB, or information configured for the UE by the eNB, and may be omitted, for redundant description, in the description made with reference to FIG. 7.

The eNB (1) may transmit the cancellation scheme of the interfering signal of the UE to UE(2) (S73). The cancellation scheme of the interfering signal may include the demodulation based interference cancellation scheme or the decoding based interference cancellation scheme, and its detailed description will be understood with reference to the aforementioned description.

If the cancellation scheme of the interfering signal, which is determined for the UE(2), is received, the UE(2) may cancel the interfering signal from the downlink received signal in accordance with the cancellation scheme of the received interfering signal (S74). The control information for cancellation of the interfering signal, which is required for the UE(2), may be varied depending on which cancellation scheme of the interfering signal has been determined As described above, if the cancellation scheme of the interfering signal is the decoding based IC scheme, for example, if the PDSCH of the interfering signal is DM-RS based signal, the seed value of the DM-RS sequence may additionally be received from the eNB(1). The UE(2) may generate the corresponding DM-RS sequence by using the seed value of the DM-RS sequence and estimate the interfering signal through the generated DM-RS sequence, thereby cancelling the interfering signal from the received signal.

Meanwhile, if the cancellation scheme of the interfering signal is the demodulation based IC scheme, the UE(2) may additionally receive C-RNTI of another UE (that is, UE intended to receive the interfering signal), which has scrambled the PDCCH of the interfering signal, from the eNB(1). The UE(2) may perform blind decoding for the PDCCH (of the interfering signal) by using C-RNTI of the another UE, and if the blind decoding is successfully performed, the UE(2) may receive DCI of the corresponding interfering signal. Therefore, the UE(2) may decode the corresponding interfering signal.

Figure 8:
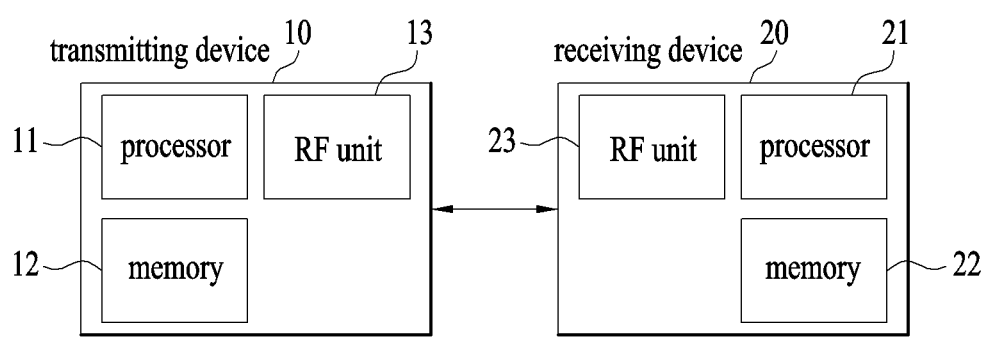
FIG. 8 is a block diagram illustrating a device for implementing the embodiment(s) of the present invention.

FIG. 8 is a block diagram illustrating elements of a transmitting device 10 and a receiving device 20 for implementing the embodiment(s) of the present invention. The transmitting device 10 and the receiving device 20 include radio frequency (RF) units 13 and 23 for transmitting or receiving a wire and/or radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output information. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs predetermined coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt is a positive integer greater than 1) transmitting antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr receiving antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink.

The transmitting device 10 and/or the receiving device 20 may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a communication device such as a user equipment, a relay and a base station.

The invention claimed is:
1. A method for enabling a base station to support cancellation of an interfering signal from a received signal of a user equipment (UE) in a wireless communication system, the method comprising:
receiving, from the UE, information on capability relating to carrier aggregation (CA), the information on capability relating to CA including a CA bandwidth class and multiple input multiple output (MIMO) capability of the UE for each band of each band combination for the CA;
determining a cancellation scheme of an interfering signal of the UE, based on the information on capability relating to CA, a number of component carriers (CCs) configured for the UE, a number of layers of a downlink signal intended to the UE, a number of codewords of the downlink signal intended to the UE, and an uplink timing advance value for the UE; and
transmitting, to the UE, information of the determined cancellation scheme.

2. The method according to claim 1, wherein the cancellation scheme is one of a decoding based interference cancellation scheme and a demodulation based interference cancellation scheme.

3. The method according to claim 1, wherein the determining the cancellation scheme is performed per band of each band combination.

4. The method according to claim 1, wherein the determining the cancellation scheme includes:
selecting a decoding based interference cancellation scheme as the cancellation scheme if NCC−N≥1, NLAYERS−nLAYERS≥1, NCW−nCW≥1 and TTA≤TTA_Threshold; and
else, selecting a demodulation based interference cancellation scheme as the cancellation scheme,
where NCC is a maximum number of CCs supported by the UE, N is the number of CCs configured for the UE, NLAYERS is a maximum number of layers supported by the UE, nLAYERS is the number of layers of the downlink signal intended to the UE, NCW is a maximum number of codewords supported by the UE, nCW is the number of codewords of the downlink signal intended to the UE, TTA is the uplink timing advance value for the UE, and TTA_Threshold is a specific threshold value.

5. A method for enabling a user equipment (UE) to receive information required for cancellation of an interfering signal from a received signal in a wireless communication system, the method comprising:
reporting, to a base station, information on capability relating to carrier aggregation (CA), the information on capability relating to CA including a CA bandwidth class and multiple input multiple output (MIMO) capability of the UE for each band of each band combination for the CA; and
receiving, from the base station, information on a cancellation scheme of an interfering signal of the UE, which is determined based on the information on capability relating to CA, a number of component carriers (CCs) configured for the UE, a number of layers of a downlink signal intended to the UE, a number of codewords of the downlink signal intended to the UE, and an uplink timing advance value for the UE.

6. The method according to claim 5, wherein the cancellation scheme is one of a decoding based interference cancellation scheme and a demodulation based interference cancellation scheme.

7. The method according to claim 5, wherein the cancellation scheme is determined per band of each band combination.

8. A base station for supporting cancellation of an interfering signal from a received signal of a user equipment (UE) in a wireless communication system, the base station comprising:
a radio frequency (RF) unit; and
a processor operably coupled with the RF unit and configured to:
receive, from the UE, information on capability relating to carrier aggregation (CA), the information on capability relating to CA including a CA bandwidth class and multiple input multiple output (MIMO) capability of the UE for each band of each band combination for the CA;
determine a cancellation scheme of an interfering signal of the UE, based on the information on capability relating to CA, a number of component carriers (CCs) configured for the UE, a number of layers of a downlink signal intended to the UE, a number of codewords of the downlink signal intended to the UE, and an uplink timing advance value for the UE; and transmit, to the UE, information of the determined cancellation scheme.

9. A user equipment (UE) configured to receive information required for cancellation of an interfering signal from a received signal in a wireless communication system, the UE comprising:

a radio frequency (RF) unit; and a processor operably coupled with the RF unit and configured to:

report, to a base station, information on capability relating to carrier aggregation (CA), the information on capability relating to CA including a CA bandwidth class and multiple input multiple output (MIMO) capability of the UE for each band of each band combination for the CA; and receive, from the base station, information on a cancellation scheme of an interfering signal of the UE, which is determined based on the information on capability relating to CA, a number of component carriers (CCs) configured for the UE, a number of layers of a downlink signal intended to the UE, a number of codewords of the downlink signal intended to the UE, and an uplink timing advance value for the UE.

* * * * *